United States Patent Office 2,766,251
Patented Oct. 9, 1956

2,766,251

PYRIDINE COMPOUNDS

Ellis V. Brown, Millburn, N. J., assignor to Nepera Chemical Co., Inc., Yonkers, N. Y., a corporation of New York No Drawing. Application March 15, 1956,
Serial No. 571,600

11 Claims. (Cl. 260—295)

This invention relates to nitro-substituted pyridine carboxylic acids of the formula

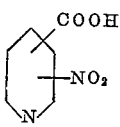

These compounds possess useful antibacterial and antifungal properties. The novel compounds of my invention are active, for example, against the organisms S. aureus, E. coli, P. vulgaris, B. subtilis, C. albicans, Ps. aeruginosa, S. hemolyticus, T. rubrum and S. schenkii. As antibacterial and antifungal agents they may be utilized therapeutically as topical ointments employing a suitable pharmaceutical vehicle, i. e. lanolin, hydrogenated vegetable oils, etc.

This application is a continuation-in-part of my copending application S. No. 401,713 filed on December 31, 1953, now abandoned.

The novel compounds of my invention may be obtained, for example, by the oxidation of the methyl group of the corresponding nitro-picoline utilizing an oxidizing agent such as potassium permanganate, for example. Other oxidizing agents which may be employed are nitric acid, selenium oxide and chromic oxide.

In order further to illustrate my invention but without being limited thereto, the following examples are given.

Example I 20 grams of 2-hydroxy-3-nitro-5-methyl pyridine are reacted with 50 ml. of phosphorous oxychloride and 10 grams of PCl$_5$ at 115° C. for 2 hours. The reaction mixture is poured onto a slurry of cracked ice and water and stirred until the 2-chloro-3-nitro-5-methyl pyridine formed crystallizes. The product is extracted with chloroform and, after evaporation of the chloroform, is crystallized from petroleum ether. 15.7 grams of the 2-chloro-3-nitro-5-methyl pyridine thus obtained is dissolved in 75 ml. of absolute ethyl alcohol, and 8 ml. of 85% hydrazine hydrate are added slowly with stirring. The reaction is exothermic and, after cooling, crystals of 2-hydrazino-3-nitro-5-methyl pyridine precipitate. The product is separated and recrystallized from alcohol, the recrystallized product melting at 167–8° C.

12.6 grams of 2-hydrazino-3-nitro-5-methyl pyridine are dissolved in a mixture of 400 ml. of water and 200 ml. of acetic acid, the solution is heated to boiling and a dropwise addition of 300 ml. of a 10% aqueous solution of copper sulfate added. After the addition of the aqueous copper sulfate is completed, the solution is maintained at the boiling point for 15 minutes, after which it is cooled and made basic with aqueous sodium hydroxide. The alkaline solution is extracted with benzene to separate the 3-nitro-5-methyl pyridine present. After removal of the benzene and recrystallization from petroleum ether, the product is found to melt at 90–91° C. Analysis for $C_6H_6N_2O_2$ is:

|  | Percent C | Percent H |
| --- | --- | --- |
| Calculated | 52.17 | 4.35 |
| Found | 52.02 | 4.51 |

Example II 1.4 grams of 3-nitro-5-methyl pyridine are added to 100 ml. of water and the solution heated to 90° C. While stirring, 3 grams of potassium permanganate are then added over the course of one-half hour. The reaction mixture is then cooled to 50° C. and filtered to remove the manganese dioxide formed. The latter is washed with water and then with benzene, which is added to the filtrate. The combined filtrate is extracted three times with benzene to remove unchanged starting material. The remaining aqueous layer is evaporated to a small volume and acidified with a very slight excess of sulfuric acid. The crude acid obtained is filtered and recrystallized from hot water. An additional yield may be obtained by extracting the acid aqueous mother liquor with ether. The product, 3-nitro-5-carboxy pyridine, melts at 171° C. and decomposes at 250° C. Analysis for $C_6H_4N_2O_4$ is:

|  | Percent C | Percent H |
| --- | --- | --- |
| Calculated | 42.85 | 2.38 |
| Found | 43.05 | 2.35 |

Example III 20 grams of 4-amino-2-methyl pyridine are dissolved in 100 ml. of concentrated sulfuric acid and the solution dropped into a solution of 350 ml. of 15% fuming sulfuric acid and 175 ml. of 30% hydrogen peroxide, while keeping the temperature at 10–20° C. When the addition is completed, the reaction mixture is stirred at 20° C. for one hour and allowed to remain at room temperature for 48 hours. The reaction mixture is poured onto cracked ice, neutralized with sodium hydroxide and extracted with benzene. 4-nitro-2-methyl pyridine separates on removal of the benzene. After recrystallization, the purified product melts at 32–34° C. Analysis for $C_6H_6N_2O_2$ is:

|  | Percent C | Percent H |
| --- | --- | --- |
| Calculated | 52.17 | 4.35 |
| Found | 51.80 | 4.18 |

The 4-nitro-2-methyl pyridine is converted to the desired 4-nitro-2-carboxy pyridine in the manner described in Example II. The 4-nitro-2-carboxy pyridine obtained by the oxidation of the methyl group melts with decomposition at 152° C. Analysis for $C_6H_4N_2O_4$ is:

|  | Percent C | Percent H |
| --- | --- | --- |
| Calculated | 42.85 | 2.38 |
| Found | 43.12 | 2.72 |

Example IV 4-amino-3-methyl pyridine is oxidized with sulfuric acid and hydrogen peroxide in the manner described in Example III. A yield of 82% of theory of 4-nitro-3-methyl pyridine is obtained melting at 28–29° C. The product analyzes for C—52.7%; H—4.5%.

The 4-nitro-3-methyl pyridine is oxidized to the corresponding carboxylic acid as described in Example II. The 4-nitro-3-carboxy pyridine obtained melts with decomposition at 120° C. The compound forms a hydrate on recrystallization from water. Analysis for $C_6H_4N_2O_4 \cdot H_2O$ is:

|  | Percent C | Percent H |
|---|---|---|
| Calculated | 38.71 | 3.22 |
| Found | 39.01 | 3.02 |

*Example V*

2-nitro-4-methyl pyridine is obtained by the oxidation with persulfuric acid of 2-amino-4-methyl pyridine in accordance with the method of Wiley and Hartman, J. Am. Chem. Soc., 73, 494 (1951).

The oxidation of 2-nitro-4-methyl pyridine with potassium permanganate in the manner described in Example II yields 2-nitro-4-carboxy pyridine which melts at 175° C. after recrystallization from water. Analysis of this compound for $C_6H_4O_2N_4$ is:

|  | Percent C | Percent H |
|---|---|---|
| Calculated | 42.85 | 2.38 |
| Found | 42.90 | 2.61 |

*Example VI*

2-nitro-3-methyl pyridine is obtained by the oxidation with persulfuric acid of 2-amino-3-methyl pyridine in accordance with the method of Wiley and Hartman, J. Am. Chem. Soc., 73, 494 (1951).

The oxidation of 2-nitro-3-methyl pyridine with potassium permanganate in the manner described in Example II yields 2-nitro-3-carboxy pyridine which melts at 156° C. after recrystallization from water. Analysis of this compound for $C_6H_4O_2N_4$ is:

|  | Percent C | Percent H |
|---|---|---|
| Calculated | 42.85 | 2.38 |
| Found | 43.07 | 2.43 |

*Example VII*

2-nitro-5-methyl pyridine is obtained by the oxidation with persulfuric acid of 2-amino-5-methyl pyridine in accordance with the method of Wiley and Hartman, above.

The oxidation of 2-nitro-5-methyl pyridine with potassium permanganate in the manner described in Example II yields 2-nitro-5-carboxy pyridine which melts at 183° C. after recrystallization from water. Analysis of this compound for $C_6H_4O_2N_4$ is:

|  | Percent C | Percent H |
|---|---|---|
| Calculated | 42.85 | 2.38 |
| Found | 42.85 | 2.54 |

*Example VIII*

2-nitro-6-methyl pyridine is obtained by the oxidation with persulfuric acid of 2-amino-6-methyl pyridine in accordance with the method of Wiley and Hartman, above.

The oxidation of 2-nitro-6-methyl pyridine with potassium permanganate in the manner described in Example III yields 2-nitro-6-carboxy pyridine which melts at 168° C. after recrystallization from water. Analysis of this compound for $C_6H_4N_2O_2 \cdot H_2O$ (hydrate) is:

|  | Percent C | Percent H |
|---|---|---|
| Calculated | 38.71 | 3.22 |
| Found | 39.00 | 3.15 |

*Example IX*

4 grams of 2-hydroxy-3-nitro-4-methyl pyridine, prepared by the method of Lappin and Slezak, J. Am. Chem. Soc., 72, 2806 (1950), are reacted with phosphorous oxychloride and PCl₅, as described in Example I, and after separation and recrystallization of the product formed, a yield of 80% of theory of 2-chloro-3-nitro-4-methyl pyridine is obtained melting at 46–47° C. 3.25 grams of the 2-chloro-3-nitro-4-methyl pyridine are mixed with 7 grams of benzoic acid and heated to 150° C. and 5 grams of copper powder slowly added over the course of five minutes. The melt is stirred and after cooling is treated with a mixture of both chloroform and 20% aqueous sodium carbonate. The benzoic acid dissolves in the aqueous layer as the sodium salt. The mixture is filtered, the layers separated and the aqueous layer extracted twice more with chloroform. The chloroform extracts are combined and evaporated. A yield of 3-nitro-4-methyl pyridine equal to 70% of theory is obtained.

The 3-nitro-4-methyl pyridine obtained is oxidized to 3-nitro-4-carboxy pyridine as described in Example II. On recrystallization from water, the 3-nitro-4-carboxy pyridine obtained melts at 217° C. Analysis for $C_6H_4N_2O_4$ is the following:

|  | Percent C | Percent H |
|---|---|---|
| Calculated | 42.85 | 2.38 |
| Found | 42.74 | 2.42 |

*Example X*

3-nitro-2-methyl pyridine is obtained according to the procedure of Baumgarten and Su, J. Am. Chem. Soc., 74, 3828 (1952).

Oxidation of 3-nitro-2-methyl pyridine, following the process of Example II, yields 3-nitro-2-carboxy pyridine. This compound, after being recrystallized from water, has a melting point of 105° C. Analysis for $C_6H_4N_2O_4$ is the following:

|  | Percent C | Percent H |
|---|---|---|
| Calculated | 42.85 | 2.38 |
| Found | 43.21 | 2.43 |

*Example XI*

2-methyl-5-nitro pyridine is obtained by nitrating 2-amino-6-methyl pyridine, separating 2-amino-3-nitro-6-methyl pyridine from the isomers, and replacing the amino group with hydrogen. The procedure is given by Baumgarten and Su, supra.

Oxidation of the 2-methyl-5-nitro pyridine thus obtained is effected as described in Example II. The 2-carboxy-5-nitro pyridine thus obtained, after purification and recrystallization, melts at 210° C. Analysis for $C_6H_4N_2O_4$ is:

|  | Percent C | Percent H |
|---|---|---|
| Calculated | 42.85 | 2.38 |
| Found | 42.92 | 2.49 |

It is understood that the foregoing detailed description is given merely by way of illustration and that many variations may be made therein without departing from the spirit of my invention.

Having described my invention, what I desire to secure by Letters Patent is:

What I claim is:

1. The nitro-pyridine carboxylic acids of the formula

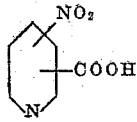

2. The nitro-pyridine carboxylic acids of the formula

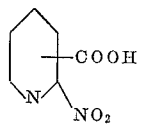

3. The nitro-pyridine carboxylic acids of the formula

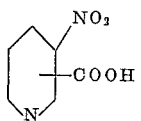

4. The nitro-pyridine carboxylic acids of the formula

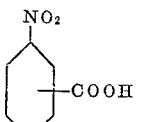

5. 2-nitro-6-carboxy pyridine.
6. 2-nitro-3-carboxy pyridine.
7. 3-nitro-4-carboxy pyridine.
8. 4-nitro-3-carboxy pyridine.
9. 3-nitro-5-carboxy pyridine.
10. Process for the preparation of nitro-pyridine carboxylic acids of the formula

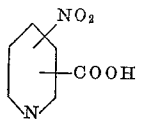

which comprises oxidizing a nitro-picoline of the formula

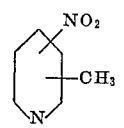

11. Process in accordance with claim 10 wherein the oxidizing agent is potassium permanganate.

No references cited.